United States Patent [19]

Foulks, Jr.

[11] 4,141,866

[45] Feb. 27, 1979

[54] SOAPS AND ESTER-SOAPS OF α-ALKYL BRANCHED MONOCARBOXYLIC ACIDS

[75] Inventor: Harold C. Foulks, Jr., Newport, Ky.

[73] Assignee: Emery Industries, Inc., Cincinnati, Ohio

[21] Appl. No.: 871,354

[22] Filed: Jan. 23, 1978

Related U.S. Application Data

[60] Division of Ser. No. 722,990, Sep. 13, 1976, and a continuation-in-part of Ser. No. 535,603, Dec. 23, 1974, Pat. No. 4,029,683.

[51] Int. Cl.² .................... C08K 5/10; C08H 3/00; C09F 5/08; C11C 3/02
[52] U.S. Cl. .................... 260/23 XA; 260/23 R; 260/31.2 R; 260/31.6; 260/410.6; 260/410.7; 260/410.9 R
[58] Field of Search .......... 260/410.6, 410.7, 410.9 R, 260/23 XA, 23 R, 31.2 R, 31.6

[56] References Cited

U.S. PATENT DOCUMENTS

| | | | |
|---|---|---|---|
| 3,640,828 | 2/1972 | Brotz et al. | 252/17 |
| 4,038,297 | 7/1977 | Rodenberg | 260/413 HC |
| 4,065,418 | 12/1977 | Foulks et al. | 260/23 XA |

Primary Examiner—Winston A. Douglas
Assistant Examiner—P. E. Konopka
Attorney, Agent, or Firm—Gerald A. Baracka; John D. Rice

[57] ABSTRACT

Soaps and ester-soaps of high molecular weight α-alkyl branched aliphatic monocarboxylic acids obtained from high molecular weight α-olefins are useful lubricants for structural resins. The high molecular weight acids useful for the preparation of the soaps and ester-soaps are obtained by the free radical addition of a short-chain monocarboxylic acid and α-olefins containing 22 or more carbon atoms. The soaps and ester-soaps of this invention provide excellent internal-external lubrication for PVC homopolymers and copolymers.

11 Claims, No Drawings

SOAPS AND ESTER-SOAPS OF α-ALKYL BRANCHED MONOCARBOXYLIC ACIDS

CROSS-REFERENCES

This is a division, of application Ser. No. 722,990, filed Sept. 13, 1976.

This is a continuation-in-part of my copending application Ser. No. 535,603, filed Dec. 23, 1974, now U.S. Pat. No. 4,029,683.

BACKGROUND OF THE INVENTION

To facilitate processing of most resin compositions (e.g. acrylonitrile-butadiene-styrene resins, polystyrene resins, polyamide resins and polyvinylchloride (PVC) resins) lubricants are required if useful and uniform finished products are to be obtained. Lubricants paly a particularly important role in the extrusion, injection molding and blow molding of rigid PVC resin compositions.

Both internal and external lubrication is essential to maintain acceptable flow characteristics and rheological properties of the melt throughout the processing and to obtain a useful finished product. Internal lubrication operates within the melt to reduce the melt viscosity of the polymer at the processing temperature and improve the flow characteristics of the materials so that a high output is possible using a minimum amount of work and without destroying (degrading) the physical properties of the resin. External lubrication is required to reduce friction and sticking at the interface between the plastic melt and the metal surfaces of the processing equipment in order to obtain a consistently uniform product having a smooth finish and essentially free of surface defects.

Emphasis has recently been shifted to developing new and better lubricant compounds which meet all the lubrication requirements for processing PVC and other resins, that is, function both as internal and external lubricants. Several commercially available ester and ester-soap waxes derived from montanic acids are recommended for this purpose. Montan wax acids are mixed monocarboxylic acids obtained from lignite and typically contain from about 22 to 35 carbon atoms with the predominant acids falling in the $C_{26}$-$C_{32}$ range. The bulk of the monocarboxylic acids derived from montan wax are aliphatic straight-chain acids having an even number of carbon atoms.

SUMMARY OF THE INVENTION

Novel soaps and ester-soaps obtained from high molecular weight synthetic acids derived from α-olefins containing 22 or more carbon atoms have now been discovered. It has also quite unexpectedly been found that these products exhibit superior internal-external lubrication properties with thermoplastic resins at 0.1 to 5 phr level. Esters partially saponified with calcium are particularly useful as lubricants for PVC copolymers and homopolymers.

The soaps and ester-soaps of this invention are derived from high molecular weight α-alkyl branched aliphatic saturated monocarboxylic acids obtained by the free-radical addition of a short-chain monocarboxylic acid containing 3 to 12 carbon atoms, and preferably 3 to 6 carbon atoms, and an α-olefin. Especially useful acids are obtained when the short-chain monocarboxylic acid is propionic acid. The α-olefin may be a single olefin but more typically will be a mixture of olefins containing 22 or more carbon atoms. While the olefins may contain as many as 100 carbon atoms they preferably will have 22 to 60 carbon atoms. Olefin mixtures will preferably have 85% or more olefins in the $C_{22-60}$ range. Soaps of the α-alkyl branched monocarboxylic acids include those obtained with alkali metals, alkaline earth metals, amphoteric metals and heavy metals. The insoluble metal soaps of lithium, calcium, barium, magnesium, zinc or tin and combinations thereof are especially useful for this invention. Ester-soaps obtained by the partial saponification of esters of α-alkyl branched monocarboxylic acids and aliphatic hydroxylic compounds containing 2 to 25 carbon atoms and 1 to 10 primary or secondary hydroxyl groups, and more preferably 2 to 12 carbon atoms and 2 to 8 hydroxyl groups, are useful. The ester-soaps typically have metal contents in the range 0.5 to 2.5 weight percent. Products of this invention which are especially useful as lubricants for PVC homopolymers and copolymers are obtained by the partial saponification with lithium, calcium, barium, magnesium, zinc or tin, and mixtures of these metals, of esters derived from polyols or ether polyols selected from the group consisting of ethylene glycol, neopentyl glycol, mono-, di-, and tripentaerythritol or mono-, tri-, di- and tetraglycerol. These ester-soaps preferably contain from about 1 to 2% by weight of the metal, have acid values less than 30 and melt in the range 50°–120° C.

DETAILED DESCRIPTION

The present invention relates to useful soaps and ester-soaps of synthetic high molecular weight aliphatic monocarboxylic acids and to the use of these compositions as lubricants for PVC homopolymers and copolymers. The high molecular weight synthetic monocarboxylic acids employed for this invention are obtained from α-olefins, that is, olefins having terminal unsaturation, containing 22 or more carbon atoms. These α-olefins may contain from 22 up to as many as 100 carbon atoms but more usually will have 22 to 60 carbon atoms. The α-olefin employed for the preparation of the synthetic acids may be a single olefin but more typically will be a mixture of olefins containing 22 to 100 carbon atoms (hereinafter referred to as $C_{22+}$ α-olefins). Preferably the $C_{22+}$ α-olefins will be mixtures wherein the predominant olefins have 22 to 60 carbon atoms. Especially useful synthetic acids for the preparation of the soaps and ester-soaps of this invention are obtained using $C_{22+}$ α-olefins where 85% or more olefins have 22 to 60 carbon atoms and excellent results are obtained when 70% by weight or more of the olefins have from 28 to 44 carbon atoms. Small amounts of olefins containing less than 22 carbon atoms may be present in these mixtures, however, for best results the amount should not exceed 10% by weight of the total olefins and, more typically, will be less than 5 weight percent. Internal olefins may be present in the mixture, however, α-olefins of the type $>C=CH_2$ should constitute at least 55% of the mixture and, more preferably, these α-olefins will constitute 70% by weight or more of the mixture. Both vinyl ($RCH=CH_2$) compounds and vinylidene ($R_1R_2C=CH_2$) compounds can be reacted with the short-chain monocarboxylic acids to obtain acids useful in the preparation of improved esters and are included within the definition of α-olefins for the purpose of this invention.

Alpha-olefin satisfying the above-requirements are generally obtained by the polymerization of ethylene. Reactions, referred to as chain growth reactions, where ethylene is added to an aluminum alkyl and inserted between the aluminum and one of the alkyl groups are practiced commercially and described in the literature. Alpha-olefins of predetermined average size are obtained by terminating the growth reaction when the required amount of ethylene has been added and then displacing the long-chain alkyl group. The length of the alkyl group will be dependent on the reaction conditions employed and the amount of ethylene charged. Numerous variations of these processes are possible to shift the α-olefin distribution and are within the skill of the art. When olefins having a narrow molecular weight distribution are desired it may be necessary to fractionally distill, solvent extract or otherwise treat the resulting olefin product prior to preparation of the high molecular weight acids.

Alpha-olefin mixtures available from commercial sources are readily used to obtain the synthetic acids useful for the preparation of the present improved lubricant products. For example, Gulf Oil Chemicals Company's $C_{22}$-$C_{28}$α-olefin fraction and $C_{30+}$α-olefin fraction can be advantageously employed. The $C_{22}$-$C_{28}$α-olefin fraction has a melting point (ASTM D 127) of about 106° F. and typically containing 85–95 weight percent $C_{22}$-$C_{18}$α-olefins, less than 7.5 weight percent $C_{20}$ and lower α-olefins and less than 7.5 weight percent $C_{30}$ and higher olefins. The $C_{30+}$α-olefin has a melting point of about 165° F. and generally contains 85–98% $C_{28-44}$α-olefins as illustrated by the following compositional breakdown obtained by gas-liquid chromatographic analysis of two different $C_{30+}$α-olefin samples.

| Olefin Component | Sample 1 | Sample 2 |
|---|---|---|
| $C_{24}$ | 0.9 | 0.3 |
| $C_{26}$ | 6.1 | 3.8 |
| $C_{28}$ | 14.8 | 15.4 |
| $C_{30}$ | 17.3 | 21.3 |
| $C_{32}$ | 15.8 | 19.4 |
| $C_{34}$ | 13.8 | 14.7 |
| $C_{36}$ | 8.9 | 11.5 |
| $C_{38}$ | 6.7 | 7.6 |
| $C_{40}$ | 4.9 | 4.7 |
| $C_{42}$ | 3.5 | 1.6 |
| $C_{44}$ | 3.3 | — |
| $C_{46}$ | 2.0 | — |
| $C_{48}$ | 1.3 | — |
| Total | 99.3 | 100.3 |

For the above samples, the first sample contained 89.0 weight percent $C_{28-44}$ olefins and the second sample contained 96.2 weight percent $C_{28-44}$ olefins.

Employing the above-described alpha-olefins, the high molecular weight monocarboxylic acids useful in the preparation of the products of this invention are obtained either (a) by the high-temperature ozonization of the olefin or (b) by the free-radical addition of a short-chain monocarboxylic acid and the olefin. Both these reactions are generally described in the literature.

The ozonization of high molecular weight alpha-olefins at elevated temperatures is described in application Ser. No. 566,891 filed Apr. 10, 1975. In the process high molecular weight olefins or olefin mixtures are contacted with ozone in a suitable participating reaction medium, preferably at a temperature above the titering point of the olefin/solvent reaction mixture, and then oxidatively cleaved to obtain high molecular weight monocarboxylic acids. In general the reaction procedure involves distinct steps of ozonization followed by scission and oxidation of the formed ozonides.

The first step of the process comprises reacting the olefin or olefin mixture with ozone. It is preferable in carrying out the ozonization to mix the ozone with a carrier gas. Excellent results are obtained when the carrier gas is oxygen or a mixture of oxygen with air or carbon dioxide and when the gas mixture contains from about 0.1 to about 15% by weight ozone and more preferably from about 1 to 5% ozone. The olefin is contacted with the ozone in a suitable reactor or absorber to obtain the olefin ozonide. Olefin and solvent may be fed to the reactor separately or may be combined in a mixing tank and this mixture charged.

A stoichiometric amount of ozone is generally employed if efficient contact of olefin and ozone is maintained, however, in certain systems, particularly batch processes, it may be desirable to add a slight excess of ozone to insure that all of the ozone has been converted to ozonide. Participating solvents, which are essential to the safe and efficient conduct of the process, are monocarboxylic acids containing from about 4 up to about 13 carbon atoms. Pelargonic acid and mixtures of acids containing 50% or more pelargonic acid are especially useful participating solvents. In conducting the process the weight ratio of the olefin to participating solvent may range from about 2:1 to about 1:10 with best results being obtained at weight ratios between about 1:1 and 1:3. The olefin and participating solvent may be combined prior to contacting with the ozone or at least part of the solvent may be added continuously or incrementally at any stage prior to the oxidation and scission step. The temperature at which the ozonization is conducted is also important and should be maintained above about 50° C. and preferably above the titering point of the reaction mixture. Temperatures in the ozonization step will therefore usually range between about 60° C. and about 85° C., however, they may go as high as 100° C.

The olefin ozonide formed during the ozonization step is next reacted with oxygen under conditions which promote scission and oxidation of the ozonide to the acid products. The scission and oxidation steps may be conducted simultaneously or as separate and distinct operations. This is achieved in conventional equipment employing either batch or continuous procedures, the only requirement being that the olefin ozonide be intimately mixed with oxygen and some means provided for temperature control. The usual temperatures employed in the scission and oxidation steps of the process range between about 75 and 145° C. If distinct steps are employed for the scission and oxidation the same temperature may be employed, however, it is more customary to conduct the oxidation at slightly higher temperatures than the scission. Temperatures between about 85 and 105° C. are normally employed to the cleave the olefin ozonides whereas it is preferred that the oxidation be conducted at temperatures between about 100 and 125° C. Uniform and controllable scission and oxidation are obtained when these temperature limits are observed.

An amount of gaseous oxygen sufficient to completely oxidize the ozonide is required. While pure oxygen may be advantageously employed other oxygen-containing gases such as mixtures of oxygen with argon, helium, neon or nitrogen may also be used for this purpose, however, the gas mixtures should contain at least 20% by weight oxygen. An amount of oxygen ranging from about 1 to about 4 moles of oxygen per mole of olefin is used but larger amounts may be employed, as desired, to speed the process, insure complete oxidation and improve yields. The efficiency of contacting the materials is important since the time required for splitting and oxidizing the ozonides is highly dependent thereon. In most instances this phase of the reaction is substantially complete in from about ½ to about 20 hours.

Catalysts are not necessary to bring about the scission and oxidation of the ozonide, however, they are usually desirable to accelerate these reactions. Synergistic combinations of catalytic agents may be used. Useful materials which may be added to the ozonide mixture prior to subjecting it to oxidation and which serve as catalytic agents include the alkali and alkaline earth metal hydroxides and various metal compounds including salts of Group VIII metals, preferably, iron, cobalt and nickel, and other compounds of these and other metals such as manganese. The chlorides, sulfates and carboxylates of these metals are useful as are the oxides and hydroxides. The metal compounds may be used individually or in combination with two or more metal compounds. The amount of the total catalyst will range from about 0.01% to about 2% by weight of the total reaction mixture.

Employing olefin feeds as described above in the ozonization process of U.S. application Ser. No. 361,205, the resulting straight-chain mixed acids will generally contain less than 30 weight percent acids having fewer than 21 carbon atoms. The bulk of the mixed acids contain 21 or more carbon atoms with $C_{21-35}$ acids containing 55% by weight or more of the mixed monocarboxylic acid product with less than 20% by weight acids having greater than about 35 carbon atoms. Most often, particularly when $C_{30+}$ olefins are employed, the acid compositions will contain less than about 20 weight percent acids having fewer than 21 carbon atoms, greater than 70 weight percent $C_{21-35}$ acids and less than about 10% acids containing more than 35 carbon atoms. The ratio of odd carbon content acids to even carbon content acids in the $C_{21-35}$ range is between 1.5:1 and 10:1. This ratio is more generally from about 1.75:1 to about 4:1. The distribution of monocarboxylic acids and the ratio of the odd to even carbon content acids distinguishes the soaps and ester-soaps obtained from α-olefins from those derived from montan wax acids.

Useful high molecular weight acids are also obtained by reacting the $C_{22+}$ α-olefin(s) and a saturated short-chain aliphatic monocarboxylic acid. Acids obtained by such free radical additions are predominantly saturated α-alkyl monocarboxylic acids having at least 25 carbon atoms. The molecular weight of the resulting aliphatic acid(s) will depend on the particular end monocarboxylic acid and α-olefin or α-olefin mixture used, the ratio of the reactants and the reaction conditions. Free radical addition processes for reacting α-olefins and short-chain monocarboxylic acids are described in the prior art in British Pat. No. 960,894, British Pat. No. 1,098,464, British Pat. No. 1,098,465 and U.S. Pat. No. 2,823,216 as well as numerous other references.

Short-chain aliphatic monocarboxylic acids used will contain from 3 to 12 carbon atoms. Useful acids for this purpose include propionic acid, butyric acid, valeric acid, 2-ethylhexoic acid, pelargonic acid, lauric acid and the like. Preferably the short-chain acid will contain 3 to 6 carbon atoms and best results are obtained when propionic acid is reacted with the α-olefin. To bring about addition, the α-olefin and monocarboxylic acid are contacted in the presence of a suitable free-radical generating means. Particularly useful free radical initiators for this reaction are the inorganic and organic peroxides, persulfates, perborates and perchlorates.

The addition reaction is illustrated by the following equation wherein the α-olefin is a $C_{30}$ α-olefin and the monocarboxylic acid is propionic acid.

$$C_{28}H_{57}CH=CH_2 + CH_3CH_2COOH \longrightarrow C_{28}H_{57}CH_2CH_2-\underset{\underset{\displaystyle}{|}}{\overset{\overset{\displaystyle CH_3}{|}}{CH}}-COOH \qquad (I)$$

The resulting α-methyl monocarboxylic acid obtained in equation I contains 33 carbon atoms, however, it will be evident that the number of carbon atoms and therefore the molecular weight of the resulting branched chain acid(s) will vary depending on the particular α-olefin and monocarboxylic acid used. If the preferred $C_{22-60}$ olefins or mixtures thereof are employed with propionic acid, the respective α-methyl branched monocarboxylic acids will have from 25 up to 63 carbon atoms. Using a higher monocarboxylic acid, such as 2-ethylhexoic acid, with the preferred $C_{22-60}$ α-olefins would result in branched-chain acids having from 30 up to 68 carbon atoms with a $C_6$ alkyl group in the α-position.

In addition to the 1:1 adduct obtained in accordance with equation I a second molecule of olefin can react with the monocarboxylic acid and a 2:1 (olefin:acid) adduct or α,α′-dialkyl monocarboxylic acid will be formed during the reaction, particularly if an excess of the olefin is present. This reaction would be represented as follows for the $C_{30}$α-olefin and propionic acid:

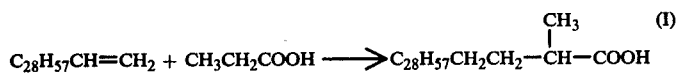

$$C_{30}H_{61}\underset{\underset{\displaystyle}{|}}{\overset{\overset{\displaystyle CH_3}{|}}{CH}}-COOH + C_{28}H_{57}CH=CH_2 \longrightarrow C_{28}H_{57}CH_2CH_2-\underset{\underset{\displaystyle CH_{30}H_{61}}{|}}{\overset{\overset{\displaystyle CH_3}{|}}{C}}-COOH \qquad (II)$$

Some α,α′-dialkyl monocarboxylic acids can also be obtained even when a molar excess of the short-chain monocarboxylic acid is employed, which is the usual procedure for carrying out the addition. The presence of substantial amounts of the 2:1 adducts is not detrimental to the formation of the high molecular weight soaps and ester-soaps of this invention or to the lubrication properties obtained therewith.

It is also possible under the free radical conditions of this reaction to form dimer and possibly higher oligomers of the α-olefins which in turn can react with the short-chain monocarboxylic acids. For example, a $C_{30}$ α-olefin might dimerize to form a $C_{60}$ α-olefin which in turn could react with the propionic acid to yield a $C_{63}$α-alkyl branched monocarboxylic acid or possibly a $C_{123}$ α,α′-dialkyl branched monocarboxylic acid. The synthetic high molecular weight branched monocarboxylic acids may also have an iodine value due to the presence of some unreacted olefin in the final product.

In a preferred embodiment of this invention, the high molecular weight synthetic branched-chain acids used for preparation of the soap and ester-soap lubricants is derived from propionic acid and a $C_{22-60}$ α-olefin mixture wherein 70% by weight or more of the olefins have from 28 to 44 carbon atoms and having a neutral equivalent of 800 and 1250, acid value of 45 to 70 and iodine value less than 15. Superior ester products exhibiting excellent internal-external lubrication properties with PVC homopolymers and copolymers are obtained using high molecular weight, branched, long-chain monocarboxylic acids having an acid value of 50-65, neutral equivalent of 925 to 1025 and iodine value less than 10.

Useful soaps and ester soaps prepared from the above-described high molecular weight acids include those obtained with alkali metals, alkaline earth metals, amphoteric metals and heavy metals. Illustrative metals include: lithium, sodium, potassium, beryllium, magnesium, calcium, strontium, barium, copper, silver, zinc, cadmium, mercury, aluminum, titanium, zirconium, tin, lead, antimony, bismuth, chromium, manganese, iron, nickel, cobalt and the like. Especially useful metallic soaps of the high molecular weight acids derived from $C_{22+}$ α-olefins are the insoluble metal salts of lithium, calcium, barium, magnesium, zinc or tin and mixtures thereof. Soaps and especially ester-soaps of these preferred metals are useful and effective lubricants for thermoplastic resins particularly polyvinylchloride homopolymers and copolymers. These products have the ability to function as both internal and external lubricants and satisfy the total lubrication needs of the resin so that the addition of other lubricant additives is not required. Because of their remarkable efficiency it is also possible to significantly reduce the amount of lubricant required in the resin formulation. Metal contents of the products of this invention can range from low levels, about 0.1 weight percent with certain ester-soaps, to as high as 15 weight percent or more with the soaps of some of the heavier metals.

The soaps are obtained employing conventional methods of preparation which are primarily the wet (precipitation) method or dry (fusion) method. The insoluble soaps can be prepared using a double decomposition reaction by dissolving the high molecular weight monocarboxylic acid in hot water and then neutralizing with sodium hydroxide to obtain the soluble sodium salt. A solution containing the desired heavy metal is then slowly added with agitation. The insoluble metal salt immediately precipitates from solution and is recovered by filtration. This reaction is usually conducted at temperatures between about 50°-90° C. Numerous modifications of the procedure are possible depending on the solubility of the reactants, the salt to be formed, etc. as will be evident to those skilled in the art. It is also possible to directly form the soaps by heating the fatty acid in the presence of a metallic oxide, hydroxide or weakly acidic salt.

Ester-soaps are obtained by partial saponification of the acid, that is, by reacting the carboxyl groups of the high molecular weight monocarboxylic acids with a metal compound and an aliphatic hydroxylic compound containing from 2 to 25, preferably 2-12, carbon atoms and from 1 to about 10, preferably 2 to 8, primary or secondary hydroxyl groups. Useful aliphatic hydroxylic compounds include monohydric alcohols, di- and higher polyhydric alcohols and ether alcohols, which can be either mono- or polyfunctional. By way of illustration useful aliphatic monohydric alcohols include ethanol, n-propanol, sec-propanol, n-butanol, t-butanol, isoamyl alcohol, n-hexanol, 2-ethylhexanol, n-octanol, isodecanol, capryl alcohol, lauryl alcohol, myristyl alcohol, cetyl alcohol, stearyl alcohol and oxo alcohols such as tridecyl alcohol which is mainly tetramethyl-1-nonanol, and hexadecyl alcohol which is a complex mixture of primary alcohols characterized as 2,2-dialkyl ethanols wherein the alkyl groups are predominantly methyl-branched $C_6$ and $C_8$ radicals. Useful aliphatic polyols for the preparation of the ester-soaps include ethylene glycol, 1,2-propylene glycol, 1,3-propylene glycol, 1,2-butanediol, 1,3-butanediol, 1,4-butanediol, 1,5-pentanediol, 2,3-dimethyl-2,3-butanediol, trimethylol propane, mannitol, sorbitol, glycerol, pentaerythritol and the like. Ether alcohols (intermolecular ethers formed by the condensation of two or more molecules of a polyol accompanied by the elimination of water) are also useful for the preparation of the ester-soaps of this invention. The ether alcohols can be either mono- or polyfunctional and contain from 2 up to as many as 8 condensed polyol units. Illustrative ether alcohols which can be employed are diethylene glycol, triethylene glycol, tetraethylene glycol, diethylene glycol monomethylether, diethylene glycol monoethylether, triethylene glycol monomethylether, butoxyethanol, butylene glycol monobutylether, dipentaerythritol, tripentaerythritol, tetrapentaerythritol, diglycerol, triglycerol, tetraglycerol, pentaglycerol, hexaglycerol, heptaglycerol, octaglycerol and the like. When polyols and ether polyols are employed it is not necessary that all the available hydroxyl groups be reacted. It is advantageous, however, when employing a polyol or mixture of polyols to have at least 50% of the available hydroxyl groups reacted.

The reaction of the metal compound and aliphatic hydroxylic compound with the high molecular weight monocarboxylic acids to obtain the ester-soaps may be conducted in a stepwise manner or all the reactants added as a unit charge. The monocarboxylic acids can first be reacted with the desired amount of metal compound to partially saponify the acid and the remaining carboxyl functionality then esterified by reaction with the hydroxylic compound. It is also possible to first esterify a portion of the carboxyl groups followed by reaction of the remaining carboxyl functionality with the metal compound. While either one of these stepwise procedures can be successfully used to yield useful ester-soaps, it is more common to carry out the reaction in a single step. In such reactions the carboxylic compound is simultaneously reacted with the metal compound and the aliphatic hydroxylic compound. The combined charge of the metal compound and hydroxylic compound should be sufficient to react with all the available carboxyl functionality.

These reactions, whether conducted in single or multi-steps, are carried out using conventional procedures and equipment, that is, by heating the reaction mixture with or without a catalyst at a temperature from about 100° C. to about 300° C. while removing water from the reaction. The reactions most generally are carried out at temperatures in the range 150°-250° C. It is not essential to employ a catalyst to promote these reactions, however, acid catalysts such as sulfuric acid, phosphoric acid, alkyl and aryl sulfonic acids such as p-toluene sulfonic acid and methane sulfonic acid, as well as a variety of metal compounds including dibutyl tin oxide, tetrabutyl titanate, zinc acetate, stannous oxalate and the like can be used. If a catalyst is employed it will usually constitute about 0.1 to 1.0% by weight of the total reactant charge. Numerous modifications of the reaction procedure are possible without detracting from the desirable lubricant properties of these products as will be evident to those skilled in the art.

Especially useful products of this invention are ester-soaps obtained employing monocarboxylic acids derived from $C_{22+}$ olefins where 85% by weight or more of the olefins have 22 to 60 carbon atoms. The soap portion of these preferred products is derived from lithium, calcium, barium, magnesium, zinc or tin or mixtures of these metals and the ester moiety is derived from a polyol or ether polyol selected from the group consisting of ethylene glycol, neopentyl glycol, mono-, di-, or tripentaerythritol, and mono-, di-, tri- or tetraglycerol. Metal contents (weight percent) of these ester-soaps ranges from about 0.5 to 2.5% and, more preferably, will be about 1.0 to 2.0%. Particularly useful ester-soaps have acid values less than 30 and melt in the range 50°–120° C. These ester-soaps have the ability to function as both internal and external lubricants and satisfy the total lubricant needs of thermoplastic resins so that the incorporation of other lubricant additives is not required. The superior performance of the products of this invention is most surprising when it is considered that similar products obtained with naturally occuring mixed acids do not exhibit the same high degree of internal-external lubrication.

In addition to the unexpectedly superior internal-external lubrication the fact that the products are readily obtainable from completely synthetic sources insuring uniformity or, where desired, controlled variation of the composition, makes them commercially attractive. The present ester-soap compositions also have other useful properties which contribute to their effectiveness and desirability as lubricants. For example, they are readily dispersible in and compatible with a wide variety of resins. They also have good heat stability and are capable of withstanding rigorous processing for prolonged periods without significant decomposition, thus insuring minimal discoloration and loss of physical properties in the finished product. The ester-soaps have high melt points which is useful in maintaining a good lubricant film and their high molecular weight makes them resistant to volatilization during the processing operation. In addition to all of the above-mentioned features these ester-soaps can also be utilized at very low levels resulting in considerable economic advantage to the user. This feature also minimizes the plasticization effect of the lubricant additive on the resin.

The soaps and ester-soaps are useful with numerous thermoplastic resins, however, they are particularly useful with polyvinylchloride homopolymers and copolymers. These products are effective lubricants for acrylonitrile-butadiene-styrene copolymers, polyacrylonitrile, polystyrene, polybutadiene, polyesters, polyolefins, polyvinylbutyral, cellulose acetate and the like. The ester-soaps also have application with post-chlorinated polyvinylchloride. Polyvinylchloride copolymers for which these materials function include those obtained when vinyl chloride is polymerized with vinyl acetate, vinyl bromide, vinyl propionate, vinyl butyrate, vinylidene chloride, methylmethacrylate, methylacrylate, 2-ethylhexylacrylate, acrylonitrile, methacrylonitrile styrene and the like, or any combination of two or more of these comonomers. These products are especially useful with polyvinylchloride resins having vinyl chloride contents above about 50 percent by weight. The amount of soap or ester-soap employed to lubricate the resins will vary between about 0.1 part and about 5 parts per 100 parts by weight of the resin, and more usually, between about 0.2 and 2 phr.

The products of this invention are readily compatible with the aforementioned resins within the limits required for efficient internal-external lubrication. They can be incorporated into PVC or other resins using conventional means such as blending on a mill or mixing in a Banbury mixer or other internal mixer or kneading apparatus. The lubricant can also be dissolved or dispersed in suitable solvents and added to the resin in this manner or it can be added separately or included in a masterbatch with other compounding ingredients. The soaps and ester-soaps are readily compatible with the other compounding ingredients such as stabilizers (to protect the resins against the deleterious affects of oxygen, heat and light), pigments, dyes, fillers, plasticizers, processing aids and the like can be used in conjunction therewith to provide formulated resins having a good balance of physical properties. The physical properties of the formulated resin can be varied considerably by manipulation of the amount and type of compounding ingredients without appreciably detracting from the internal-external lubrication properties of the present products.

The following examples illustrate the present invention more fully, however, they are not intended as a limitation on the scope thereof. In these examples all parts and percentages are given on a weight basis unless otherwise indicated.

EXAMPLE I

To obtain mixed acid products useful in the preparation of the soaps and ester-soaps of this invention equal parts of $C_{30+}$-α-olefin (Gulf $C_{30+}$ olefin fraction, m.p. 160°–167° F., containing 78 weight percent $C_{30}$ and higher olefins) and pelargonic acid were fed into the top section of a countercurrent absorber while a stream of oxygen and carbon dioxide containing approximately 1.5–2% ozone was fed into the bottom section. The rates of flow of the $O_3/O_2$ gas stream and the ozone feed were adjusted so that $C_{30+}$-α-olefin absorbed as much ozone as possible in passing through the absorber and so that all but trace amounts of ozone were removed from the oxygen. The temperature in the absorber was maintained in the range 65°–85° C. The effluent gases were scrubbed with water to remove organic vapors and particulate matter and then passed through a catalytic furnace where organic matter was oxidized to carbon dioxide and water. The gas was then dried and recycled.

The ozonide was removed from the bottom of the absorber and passed into a decomposition vessel containing a heel of pelargonic acid, 0.25% sodium hydroxide based on weight of ozonide and previously decomposed ozonide to serve as a diluent. The decomposition vessel was maintained at a temperature of 95° C. while adding oxygen containing 1% ozone and the ozonide added over a 2 hour period. When the addition was complete the decomposition was continued for 2 additional hours before transferring to an oxidation reactor. The oxidation was carried out in the presence of manganese acetate tetrahydrate (0.1% based on the $C_{30+}$ olefin) in an oxygen atmosphere. The time for oxidation was 4 hours.

The mixed oxidation product was then stirred with 0.5% phosphoric acid (75%) for 15 minutes and an activated bleaching clay (Filtrol Grade No. 1) added with additional stirring. The mass was filtered to remove the manganese salts of phosphoric acid and the filter aid and then stripped of pelargonic acid under reduced pressure using a Vigreaux column. The stripping was conducted at 230° C. and during the final stages the pressure was reduced to 0.5 torr. A portion of the mixed acid product, crystallized from glacial acetic acid, was analyzed by gas-liquid chromatography of the methyl esters employing a modification of ASTM Test Method D 1983-64T. A Hewlett Packard Model 7550 chromatograph equipped with 6 foot × ⅛ inch stainless steel column packed with 10% silicone rubber on 80–100 mesh Diatoport S was used. The instrument was programmed for an 8° C. per minute temperature rise over the range 75°–333° C. with a helium flow of 15 mls per minute and 50 psig. The mixed acid product (equivalent weight 586; 7-8 Gardner color) had the following compositional analysis:

| Acid | Wt. % |
|---|---|
| $C_{9-21}$ | 10.27 |
| $C_{22}$ | 3.85 |
| $C_{23}$ | 5.14 |
| $C_{24}$ | 3.26 |
| $C_{25}$ | 6.83 |
| $C_{26}$ | 3.08 |
| $C_{27}$ | 11.57 |
| $C_{28}$ | 2.83 |
| $C_{29}$ | 12.54 |
| $C_{30}$ | 1.72 |
| $C_{31}$ | 10.53 |
| $C_{32}$ | 1.29 |
| $C_{33}$ | 8.13 |
| $C_{34}$ | 0.89 |
| $C_{35}$ | 6.00 |
| $C_{36+}$ | 11.95 |
| | 99.88 |

EXAMPLE II

A predominantly α-methyl branched high molecular weight monocarboxylic acid was prepared by charging a glass reactor with 200 grams of an α-olefin mixture (Gulf $C_{22-28}$alpha-olefin fraction, m.p. 127° F.), 326 grams propionic acid and 8 grams di-t-butyl peroxide. The system was flushed with nitrogen and a slight nitrogen flow maintained while the reaction mixture was heated at reflux for about 4 hours. At the completion of the reaction unreacted propionic acid was removed under vacuum at 200° C. 225 Grams of predominantly $C_{25+}$α-methyl monocarboxylic acid product having an acid value of about 100 was recovered.

EXAMPLE III

A glass reactor fitted with a stirrer, condenser and thermometer was charged with 270 grams of a $C_{30+}$α-olefin mixture (Gulf$C_{30+}$α-olefin fraction, melting point 160° F., iodine value 45.8, neutral equivalent 554 containing greater than 85 weight percent olefins having from 28-44 carbon atoms). Propionic acid (444 grams) and 22.2 grams di-t-butyl peroxide were then added and the mixture heated at 135°–140° C. with agitation under a nitrogen atmosphere for about eight hours. The temperature was then increased to 164° C. (atmospheric pressure) to remove unreacted propionic acid. Final stripping was conducted up to a temperature of 200° C. under reduced pressure (2.5 mm Hg). 299 Grams of the high molecular weight branched-chain acid product having excellent color (1 Gardner) was obtained. The predominantly α-methyl branched monocarboxylic acid product had an iodine value of 4.1, acid value of 67 and neutral equivalent of 840.

EXAMPLE IV

The metallic soap of mixed $C_{29+}$ monocarboxylic acids obtained by the ozonization of an α-olefin mixture containing greater than 75% by weight olefins having 30 or more carbon atoms in accordance with the procedure of Example I was prepared by double decomposition. The sodium salt of the acid was first prepared by adding 0.1 equivalent of the mixed acids (recrystallized from 5:1 to methanol) to an aqueous solution containing 0.1 equivalent sodium hydroxide and maintaining at 85° C. The reaction mixture was stirred at 90° C. for 30 minutes and 0.1 equivalent calcium chloride dissolved in 1000 mls water added with agitation. The calcium soap immediately precipitated from solution and was recovered by filtration. After thoroughly washing with water to remove the sodium chloride the soap was dried at 65° C. The resulting calcium soap of the mixed high molecular weight acids contained 3.4 weight percent calcium, had a negligible acid value and melted at 134–143° C.

EXAMPLE V

Employing a double decomposition procedure similar to that described in Example IV the calcium soap of a high molecular weight α-methyl branched acid obtained by the addition of propionic acid to a $C_{30+}$ olefin mixture as described in Example III was prepared. 0.5 Equivalent of the high molecular weight α-methyl branched acid was first converted to the sodium salt by neutralization with 0.5 equivalent sodium hydroxide. The sodium salt was then converted to the insoluble calcium soap by the addition of an aqueous solution containing 0.5 equivalent calcium chloride. The precipitated calcium soap was washed until there was less than 0.1% sodium chloride in the filtrate and dried at 65° C. The soap contained about 2 weight percent calcium and melted between 122–128° C.

EXAMPLE VI

The cadmium soap of the α-methyl branched acid of Example III was prepared by melting 0.25 equivalent of the acid, adding the melt to 2 liters water maintained at 90° C. and neutralizing with 0.25 equivalent sodium hydroxide. 0.25 Equivalent cadmium chloride was then added to form the insoluble soap. The cadmium soap, after washing and drying, melted at 82–85° C.

EXAMPLE VII

The mercury soap of the mixed acids of Example I was prepared by dissolving 135.5 grams of the acid in warm water, neutralizing with 10 grams sodium hydroxide and then adding 67.9 grams $HgCl_2$. The recovered product melted at 109–115° C.

EXAMPLE VIII

To demonstrate the ability of the products of Example IV and V to function as lubricants for PVC the calcium soaps were incorporated in the following standard pipe formulation:

| | |
|---|---|
| PVC resin (Geon 101-EP | 100 parts |
| Tin mercaptide stabilizer | 2 parts |
| Titanium dioxide | 3 parts |
| Acrylic processing aid | 4 parts |
| Lubricant soaps | 0.5 part |

The ingredients were blended in a Henschel high-speed mixer and the resin evaluated in a Brabender plasticoder — a convenient laboratory evaluation tool which measures the flow properties of the resin against time. Evaluation conditions were as follows: resin charge 55 grams; No. 6 roller head; temperature 195° C.; and rotor speed 60 rpm. Test results obtained are set forth below and compared with an unlubricated control resin.

| Lubricant Soap | $T_s$ (time to start of fusion) | Torque (meter-grams) | $T_p$ (time to fusion peak) | Torque (meter-grams) |
|---|---|---|---|---|
| IV | 18.5 | 550 | 19.75 | 3100 |
| V | 31 | 600 | 34.5 | 3250 |
| None | 1.25 | 650 | 2.75 | 3800 |

It is evident from the above data that the soaps of this invention and especially the soaps derived from the α-methyl branched acids are effective lubricants for PVC and extend the fusion time of PVC resins.

EXAMPLE IX-XI

A series of ester-soaps having varying calcium contents were prepared employing the high molecular weight α-methyl monocarboxylic acid obtained by the free radical addition of propionic acid and a $C_{30+}$ olefin mixture. The ester-soaps were prepared by simultaneously reacting the monocarboxylic acid, tripentaerythritol and calcium hydroxide at 220–230° C. in the presence of 0.03 weight percent dibutyl tin oxide catalyst while removing the water of reaction. Reactant charges (in equivalents) and properties of the resulting ester-soaps were as follows:

| | IX | X | XI |
|---|---|---|---|
| REACTANTS: | | | |
| α-Methyl monocarboxylic acid | 1 | 1 | 1 |
| Tripentaerythritol | 0.75 | 0.5 | 0.25 |
| Calcium hydroxide | 0.25 | 0.5 | 0.75 |
| PROPERTIES: | | | |
| Wt. % Calcium | 0.53 | 1.07 | 1.46 |
| Acid Value | 20.8 | 18.5 | 16.6 |
| Hardness | 117 | 132 | 85 |

% Calcium was determined by ashing and atomic absorption (Perkin Elmer Model 303) and hardness measured in accordance with ASTM D 1321-61T.

The ester-soap products were compounded with a typical PVC resin formulation as follows:

| | |
|---|---|
| PVC resin (Diamond Shamrock PVC-40; inherent viscosity 0.83) | 100 parts |
| Acrylic processing aid | 4 parts |
| Tin mercaptide stabilizer | 2 parts |
| Epoxidized soya | 1 part |
| Ester-soap | 0.5 part |

The resin formulations were then evaluated in the Brabender machine (56 gram sample; 160° C.; No. 6 rotor head at 60 rpm). All of these ester-soaps proved to be effective lubricants for the PVC resin and extended the fusion time beyond that obtained with an unlubricated control resin or an identically formulated resin lubricated with 0.5 phr of a commercially available wax product Hoechst Wax OP produced by partial esterification of oxidatively refined (Gersthoffen process) montan wax acids by 1,3-butanediol with neutralization of unreacted carboxylic groups with calcium hydroxide. For example, the resin containing ester-soap X had not started to fuse in 20 minutes time whereas the resin containing an identical amount of the commercial wax product started to fuse ($T_s$) in 8 minutes (825 meter-grams torque) and reached its fusion peak ($T_p$) after 10 feet 30 inches at a torque of 3300 meter-grams.

EXAMPLE XII

An ester-soap was prepared by reacting 0.45 equivalent calcium hydroxide, 0.55 equivalent glycerine and 1 equivalent α-methyl branched acids obtained by the free radical addition of propionic acid and a $C_{30+}$ olefin mixture. The reaction was conducted for about 3 hours at about 228° C. in the presence of 0.03% weight butyl titanate and 0.03% weight $H_3PO_2$ catalysts. The ester-soap had an acid value of 15, melted at 78–80° C. and contained 0.85% calcium. The ester-soap (0.5 phr) was blended with a PVC copolymer (97 weight percent vinyl chloride/3 weight percent vinyl acetate), 2 phr tin stabilizer and 2 phr epoxidized soya and evaluated in the Brabender machine using the fusion conditions described in Example X. The resin did not fuse even after 50 minutes testing. The resin was further evaluated for dynamic thermal stability in the Brabender machine at a temperature of 195° C. (other test conditions remained unchanged). After 25 feet 30 inches the initial torque rise ($T_i$) was observed but thermal degradation was not complete (as evidenced by peaking of the thermal degradation curve) even after 50 minutes testing under these severe conditions.

EXAMPLE XIII

An ester-soap was prepared using a mixture of high molecular weight acids obtained by the ozonization of a $C_{30+}$ olefin mixture. To obtain the ester-soap 2889 grams mixed acids (neutral equivalent 550), 111 grams calcium hydroxide and 95.2 grams dipentaerythritol were charged to a reactor with 0.06 weight percent catalyst and heated to about 230° C. while removing the water reaction. About 80 mls water was removed from the reaction mixture. The ester-soap contained 2 weight percent calcium, had an acid value of 20 and melted in the range 82–104° C. When the ester-soap was evaluated in the Brabender machine using the PVC formulation and fusion conditions of Examples IX, results were as follows:

$T_s$ 6 feet 30 inches at 1000 meter-grams torque
$T_p$ 9 feet 12 inches at 3050 meter-grams torque

EXAMPLE XIV

In a manner similar to that described in Example XIII, the ester-soap of an α-methyl branched acid (neutral equivalent 1045) obtained by the free radical addition of propionic acid to a $C_{30+}$ olefin mixture was prepared by reacting 0.469 equivalent of the acid, 0.235 equivalent calcium hydroxide and 0.234 equivalent dipentaerythritol. The reaction was conducted at 225° C. for 3 ½ hours using a conventional catalyst system. The ester-soap (0.95 weight percent calcium; acid value 26.1) was an effective lubricant for PVC.

EXAMPLE XV

Five equivalents mixed acid having a neutral equivalent of 556 was reacted with 3 equivalents calcium hydroxide and 2 equivalents triglycerol in the presence of a catalyst. The resulting ester-soap contained 2 weight percent calcium and had an acid value of 18.6. When evaluated in the Brabender machine to determine fusion properties in accordance with the procedure and the formulations of Example IX, the following results were obtained:

$T_s$ 5 feet at 900 meter-grams torque
$T_p$ 7 feet 30 inches at 3100 meter-grams torque

EXAMPLE XVI

An ester-soap of mixed $C_{29+}$ monocarboxylic acids obtained by the ozonization of $\alpha$-olefin mixture containing 75% by weight or more olefins having 30 or more carbon atoms was prepared by reacting 0.55 equivalents glycerine and 0.45 equivalents calcium hydroxide with 1 equivalent of the mixed acid. The resulting product (recovered using a diatomaceous earth filter aid) melted in the range 84–91° C. and contained about 2 weight percent calcium. The ester-soap was blended with a polyvinylchloride resin (Diamond Shamrock PVC-40) in accordance with the following recipe:

| PVC resin | 100 parts |
|---|---|
| Octyl tin stabilizer | 2 parts |
| Epoxidized soya | 1 part |
| Ester-soap | 0.5 part |

The ingredients were blended in a high-speed mixer and then milled on a conventional two-roll mill at 350° F. Sheets were pressed in a 6 inch × 8 inch × 0.010 inch mold at 360° F. and 500 psig for 3 minutes and 200 psig for 5 minutes. The pressed 10 mil sheets had excellent clarity. 1 inch × 1 inch Squares were stamped and arranged on eight glass trays and fitted in a rotating ferris-wheel type device in an electric oven maintained at 350° F. Samples were removed from the oven at 10 minute intervals, allowed to cool and observed for color change and other signs of polymer degradation. The test was terminated when the sample failed (blackened) or after 80 minutes. The above resin formulation showed first signs of discoloration after about 30 minutes but did not fail during the 80 minute test period. A sample of the resin containing no ester-soap exhibited first discoloration after only 20 minutes and was completely degraded within 60 minutes.

When the resin was tested in the Brabender machine employing fusion conditions — the resin was not fused even after 60 minutes. Evaluating the resin for dynamic thermal stability in accordance with the test conditions of Example XII, the following results were obtained:

$T_i$ 17 feet 30 inches at 1800 meter-grams torque
$T_{tg}$ 22 feet 30 inches at 2720 meter-grams torque An unlubricated control resin gave the following results when evaluated in the Brabender for fusion and dynamic thermal stability: $T_s$ 1 foot 18 inches at 1650 meter-grams torque; $T_p$ 5 feet 45 inches at 4150 meter-grams torque; $T_i$ 9 feet at 2150 meter-grams torque; and $T_{tg}$ 12 feet 24 inches at 3400 meter-grams torque.

The ester-soap was also tested to demonstrate its affect on extrusion rate. The PVC formulation used was as follows:

| PVC (Diamond Shamrock PVC-40) | 100 parts |
|---|---|
| Acrylic processing aid | 4 parts |
| Tin mercaptide stabilizer | 2 parts |
| Epoxidized soya | 1 part |
| Ester-soap | 0.5 part |

The resin was extruded using a Brabender machine fitted with an extrusion head Model EX-200. The extrusion was conducted at a screw speed of 40 rpm (¾ inch diameter - 20:1 L/D - 4/1 compression ratio screw; ¼ inch diameter rod die). Temperatures employed were: first zone 350° F.; second zone 365° F.; and die temperature 380° F. Results obtained for the formulated resin and an unlubricated control resin were as follows:

| Lubricant | Rate (lbs/hr) | Torque | Die Pressure (psig) |
|---|---|---|---|
| Ester-soap | 4.6 | 3600 | 1200 |
| None | 3.1 | 4800 | 2800 |

EXAMPLE XVII

To further demonstrate the superior lubricating ability of the produts of this invention, two ester-soaps were prepared and evaluated in PVC with Hoechst Wax OP, a commercially available partially saponified ester wax derived from montan wax acids and 1,3-butylene glycol. Fusion properties were determined using the Brabender machine employing the previously set forth conditions. Product A, a product of this invention, contained about 2% by weight calcium and was obtained from 1,3-butylene glycol and a mixture of high molecular weight acids prepared in accordance with Example I. Another ester-soap prepared in accordance with this invention, identified as B, was the calcium (2 weight percent Ca) of the same mixed acid and a 50/50 mixture of ethylene glycol and 1,3-butylene glycol. The commercial ester-soap contained about 2 weight percent calcium, had a melt point of 100–105° C. and acid value of 10–15. Ester-soaps A and B and the commercial ester-soap were incorporated into the PVC formulation of Example XVI at a 0.5 phr level with the following results:

| Lubricant | $T_s$ | Torque | $T_p$ | Torque |
|---|---|---|---|---|
| A | 18'00" | 600 | 22'15" | 3600 |
| B | 15'15" | 750 | 20'00" | 3000 |
| Commercial Wax | 9'00" | 800 | 11'30" | 3250 |
| None | 1'00" | 1720 | 2'45" | 4200 |

The above data clearly points out the unexpected improvement obtained with the ester-soaps of this invention.

The soaps and ester-soaps of this invention, in addition to functioning as lubricants for thermoplastic resins, also find use in numerous other applications where either synthetic or natural waxes are typically used. For example, the present products are useful as slip and antiblock agents. These materials can also be utilized in a wide variety of polishes such as shoe polish, floor polish and automobile polish. To demonstrate this, an ester-soap prepared by the reaction of 0.5 equivalents glycerine and 0.5 equivalent lithium carbonate with 1 equivalent mixed acids (neutral equivalent 524) wax employed in the preparation of a shoe polish. 4.5 Parts of the ester-soap (acid value 24), 1.5 parts micro-crystalline wax (Petrolite C-1035), 3 parts carnauba wax (North Country No. 3) and 21 parts paraffin were melted at 110° C. and a 50° C. solution of 70 parts turpentine and 3 parts black dye blended with the melt. This mixture was cooled with stirring to 42° C. and poured into containers. The resulting polish gave a high luster shine when applied to shoes. The product also exhibited good surface gloss and solvent retention. Similar results were obtained with polishes prepared from esters of glycerine and tripentaerythritol partially saponified with calcium.

EXAMPLE XVIII

A partially saponified (about 1% calcium) ester was derived from $C_{30+}$ α-methyl branched acids and glycerine was evaluated in a semi-rigid PVC formulation and compared with the commercial Hoechst OP Wax. The ester-soap of this invention had an acid value in the range 45–65 and melted at about 75–85° C. The formulation employed was as follows:

| | |
|---|---|
| PVC Resin (Diamond Shamrock PVC - 450) | 100 parts |
| Glycerol monostearate | 1 part |
| Dioctylphthalate | 15 parts |
| Organotin stabilizer | 2 parts |
| Ester-soap or Commercial wax | 0.5 part |

The ingredients were mixed at 3000 rpm in a Henschel high-speed mixer and then evaluated in the Brabender machine at 93° C. The results of the evaluation were as follows:

| | $T_s$ | Torque | $T_p$ | Torque |
|---|---|---|---|---|
| Resin Lubricated With: | | | | |
| Commercial Wax | 6'54" | 4000 | 8'32" | 5000 |
| Ester-Soap | 8'45" | 3250 | 13'00" | 4600 |

When the resins were evaluated at 149° C. the following results were obtained:

| | $T_s$ | Torque | $T_p$ | Torque |
|---|---|---|---|---|
| Resin Lubricated With: | | | | |
| Commercial Wax | 0'51" | 1875 | 2'00" | 3450 |
| Ester-Soap | 4'30" | 1125 | 11'45" | 2800 |

The data clearly points out the superiority of the ester-soap waxes derived from synthetic α-methyl branched acids over similar waxes derived from montan wax acids.

I claim:

1. An ester-soap derived from an aliphatic hydroxylic compound having from 2 to 25 carbon atoms and 1 to 10 primary or secondary hydroxyl groups and an α-alkyl branched aliphatic monocarboxylic acid having at least 25 carbon atoms and obtained by the free radical addition of a short-chain saturated aliphatic monocarboxylic acid having from 3 to 12 carbon atoms and a mixture of olefins containing 22 to 100 carbon atoms with 85% by weight or more of the olefins having from 22 to 60 carbon atoms and partially saponified with a metal selected from the group consisting of an alkali metal, alkaline earth metal, amphoteric metal and heavy metal, said ester-soap containing from about 0.5 to 2.5 weight percent of the metal.

2. The ester-soap of claim 1 where the aliphatic hydroxylic compound is an aliphatic polyol or ether polyol having from 2 to 12 carbon atoms and 2 to 8 primary or secondary hydroxyl groups and the α-alkyl branched monocarboxylic acid is derived from a $C_{3-6}$ monocarboxylic acid and has a netural equivalent from 800 to 1200, acid value of 45 to 70 and iodine value less than 15.

3. The ester-soap of claim 2 wherein the hydroxylic compound is selected from the group consisting of ethylene glycol, neopentyl glycol, mono-, di-, or tripentaerythritol, mono-, di-, tri- or tetraglycerol and the metal is selected from the group consisting of lithium, calcium, barium, magnesium, zinc and tin.

4. The ester-soap of claim 3 wherein the α-alkyl branched monocarboxylic acid is derived from propionic acid and an α-olefin mixture wherein 70% by weight or more of the olefins have from 28 to 44 carbon atoms.

5. The ester-soap of claim 4 having an acid value less than 30 and melting in the range 50–120° C.

6. The ester-soap of claim 4 which contains from about 1 to 2 weight percent calcium.

7. A thermoplastic resin composition containing 0.1 to 5 parts per 100 parts resin of an ester-soap derived from an aliphatic hydroxylic compound containing 2 to 25 carbon atoms and 1 to 10 primary or secondary hydroxyl atoms and an alpha-alkyl branched aliphatic monocarboxylic acid and partially saponified with an alkali metal, alkaline earth metal, amphoteric metal or heavy metal, said alpha-alkyl monocarboxylic acid having at least 25 carbon atoms and obtained by the free radical addition of a short-chain saturated aliphatic monocarboxylic acid having from 3 to 12 carbon atoms and a mixture of alpha-olefins containing from 22 to 100 carbon atoms with 85% by weight or more of the olefins having from 22 to 60 carbon atoms.

8. The thermoplastic resin of claim 7 wherein the metal is selected from the group consisting of lithium, calcium, barium, magnesium, zinc and tin and the α-alkyl monocarboxylic acid is obtained by the reaction of a $C_{3-6}$ monocarboxylic acid and an α-olefin mixture wherein 70% by weight or more of the olefins have from 28 to 44 carbon atoms.

9. The thermoplastic resin of claim 8 wherein the resin is a polyvinylchloride resin having a vinyl chloride content above 50% by weight and contains from about 0.2 to 2 phr ester-soap.

10. The thermoplastic resin composition of claim 9 wherein the α-alkyl branched monocarboxylic acid is derived from propionic acid and has an acid value of 50-65, neutral equivalent of 925 to 1025 and iodine value less than 10.

11. The thermoplastic resin composition of claim 10 wherein the lubricant is an ester-soap derived from the α-alkyl branched monocarboxylic acid and a hydroxylic compound selected from the group consisting of ethylene glycol, neopentyl glycol, mono-, di-, or tripentaerythritol, mono-, di-, tri- and tetraglycerol and is partially saponified with 1 to 2 weight percent calcium.

* * * * *

UNITED STATES PATENT AND TRADEMARK OFFICE
CERTIFICATE OF CORRECTION

PATENT NO. : 4,141,866

DATED : February 27, 1979

INVENTOR(S) : Harold C. Foulks, Jr.

It is certified that error appears in the above-identified patent and that said Letters Patent are hereby corrected as shown below:

Col. 3, line 25, "$C_{22}-C_{18}$" should read ---$C_{22}-C_{28}$---.

Col. 5, line 35, "containing" should read ---constituting---.

Col. 13, line 1, insert ")" after 101-EP.
Col. 13, line 7, "plasticoder" should read ---plasticorder---.

Col. 14, line 9, "feet 30 inches" should read ---minutes 30 seconds---.
Col. 14, line 29, "25 feet 30 inches" should read ---25 minutes 30 seconds---.
Col. 14, line 51, "6 feet 30 inches" should read ---6 minutes 30 seconds---.
Col. 14, line 52, "9 feet 12 inches" should read ---9 minutes 12 seconds---.

Col. 15, line 8, "feet" should read ---minutes---.
Col. 15, line 9, "7 feet 30 inches" should read ---7 minutes 30 seconds---.
Col. 15, line 52, "17 feet 30 inches" should read ---17 minutes 30 seconds---.
Col. 15, line 53, "22 feet 30 inches" should read ---22 minutes 30 seconds---.

UNITED STATES PATENT AND TRADEMARK OFFICE
CERTIFICATE OF CORRECTION

PATENT NO. : 4,141,866

DATED : February 27, 1979

INVENTOR(S) : Harold C. Foulks, Jr.

It is certified that error appears in the above-identified patent and that said Letters Patent are hereby corrected as shown below:

Col. 15, line 56, "1 foot 18 inches" should read ---1 minutes 18 seconds---.
Col. 15, line 57, "5 feet 45 inches" should read ---5 minutes 45 seconds---.
Col. 15, line 58, "9 feet" should read ---9 minutes---.
Col. 15, line 59, "12 feet 24 inches" should read ---12 minutes 24 seconds---.

Claim 7, line 5, "atoms" should read ---groups---.

Signed and Sealed this

Third Day of July 1979

[SEAL]

Attest:

Attesting Officer

LUTRELLE F. PARKER
Acting Commissioner of Patents and Trademarks